Figure 1:
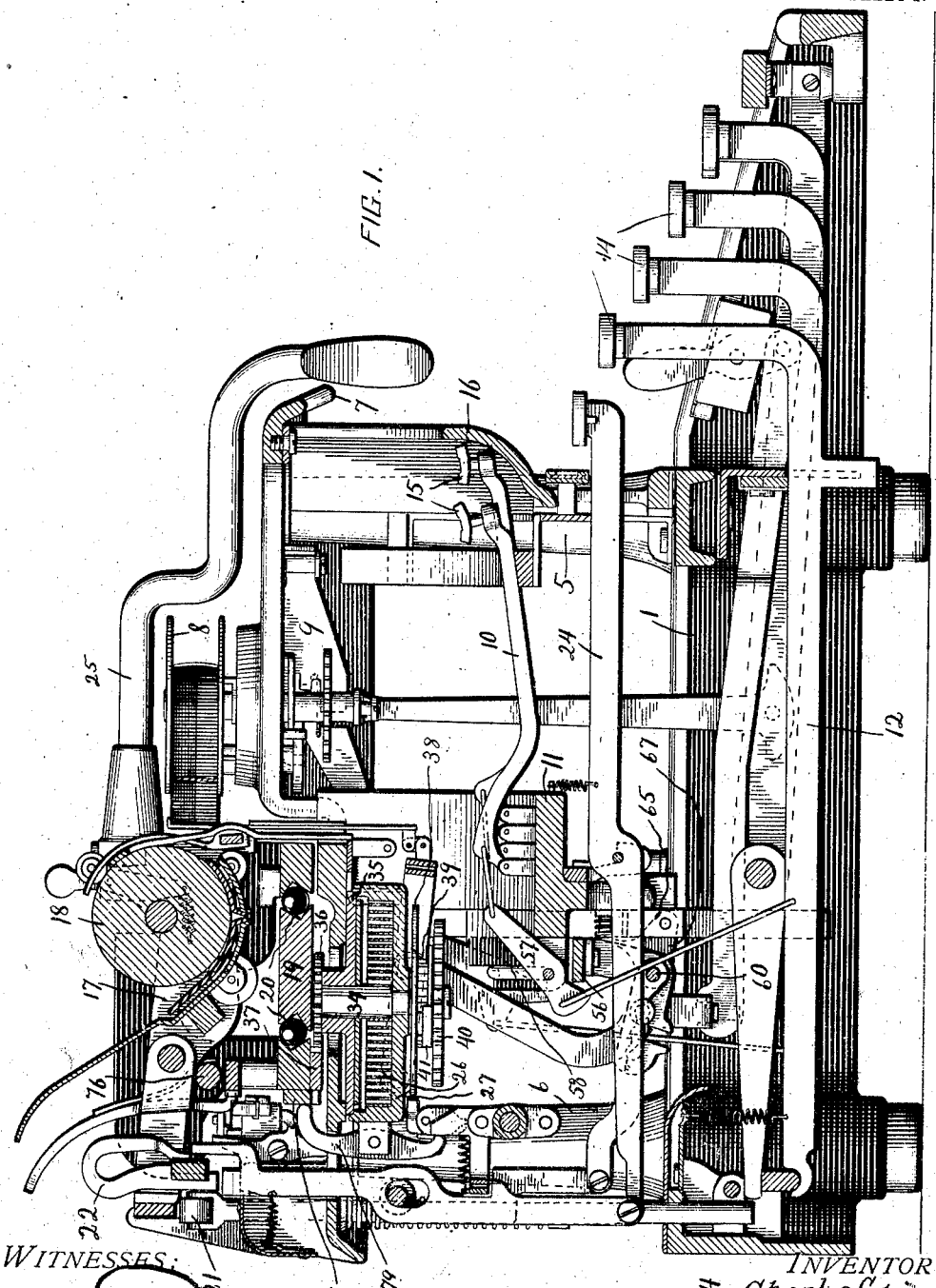

C. SPIRO.
CARRIAGE CONTROL MECHANISM.
APPLICATION FILED AUG. 15, 1910.
987,767.
Patented Mar. 28, 1911.
7 SHEETS—SHEET 4.
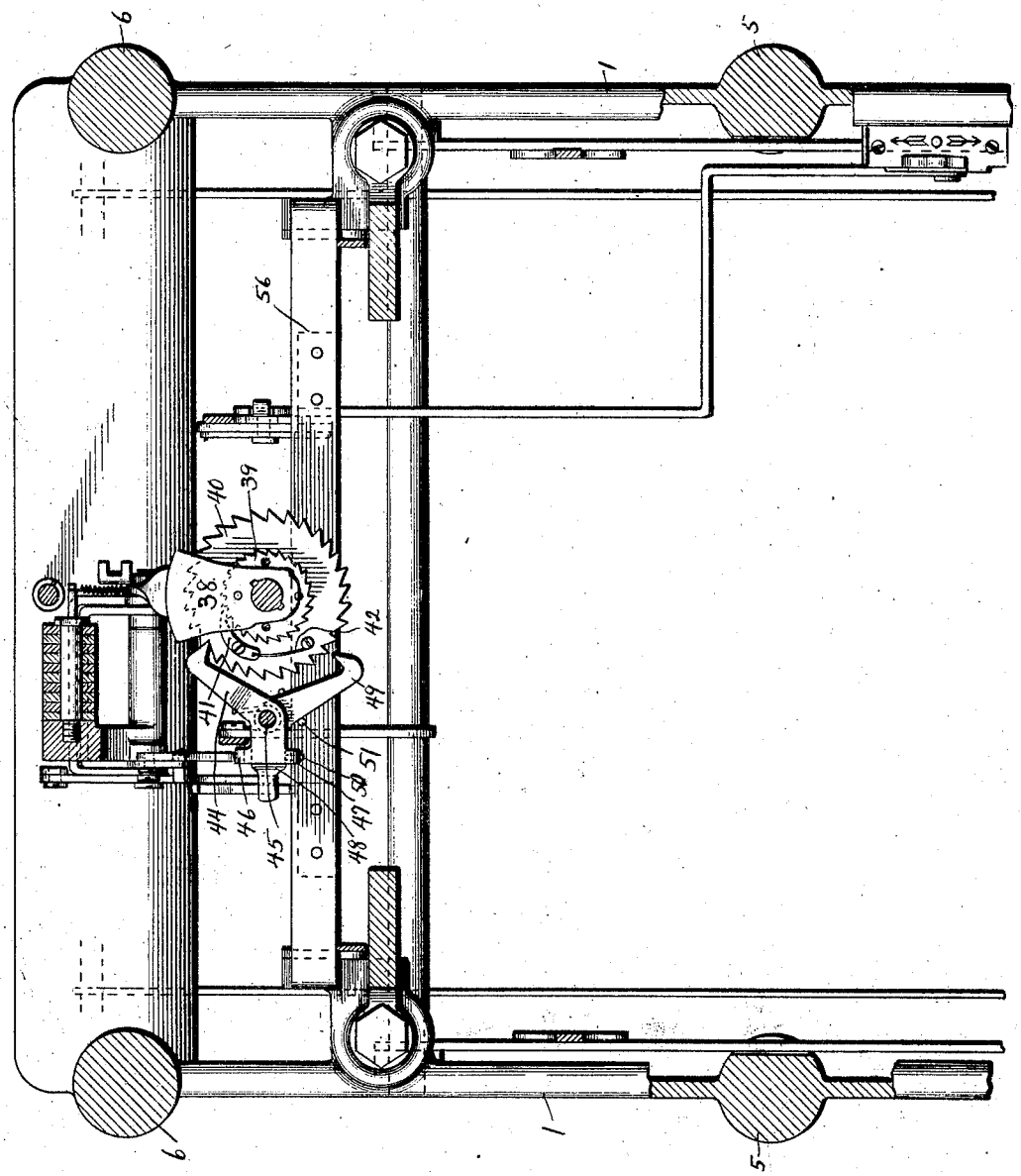
FIG. 4.
WITNESSES:
INVENTOR
Charles Spiro.
BY
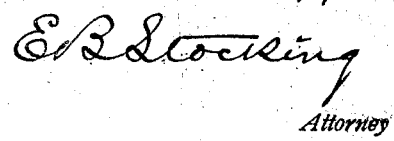
Attorney C. SPIRO.
CARRIAGE CONTROL MECHANISM.
APPLICATION FILED AUG. 15, 1910.
987,767.
Patented Mar. 28, 1911.
7 SHEETS—SHEET 5.
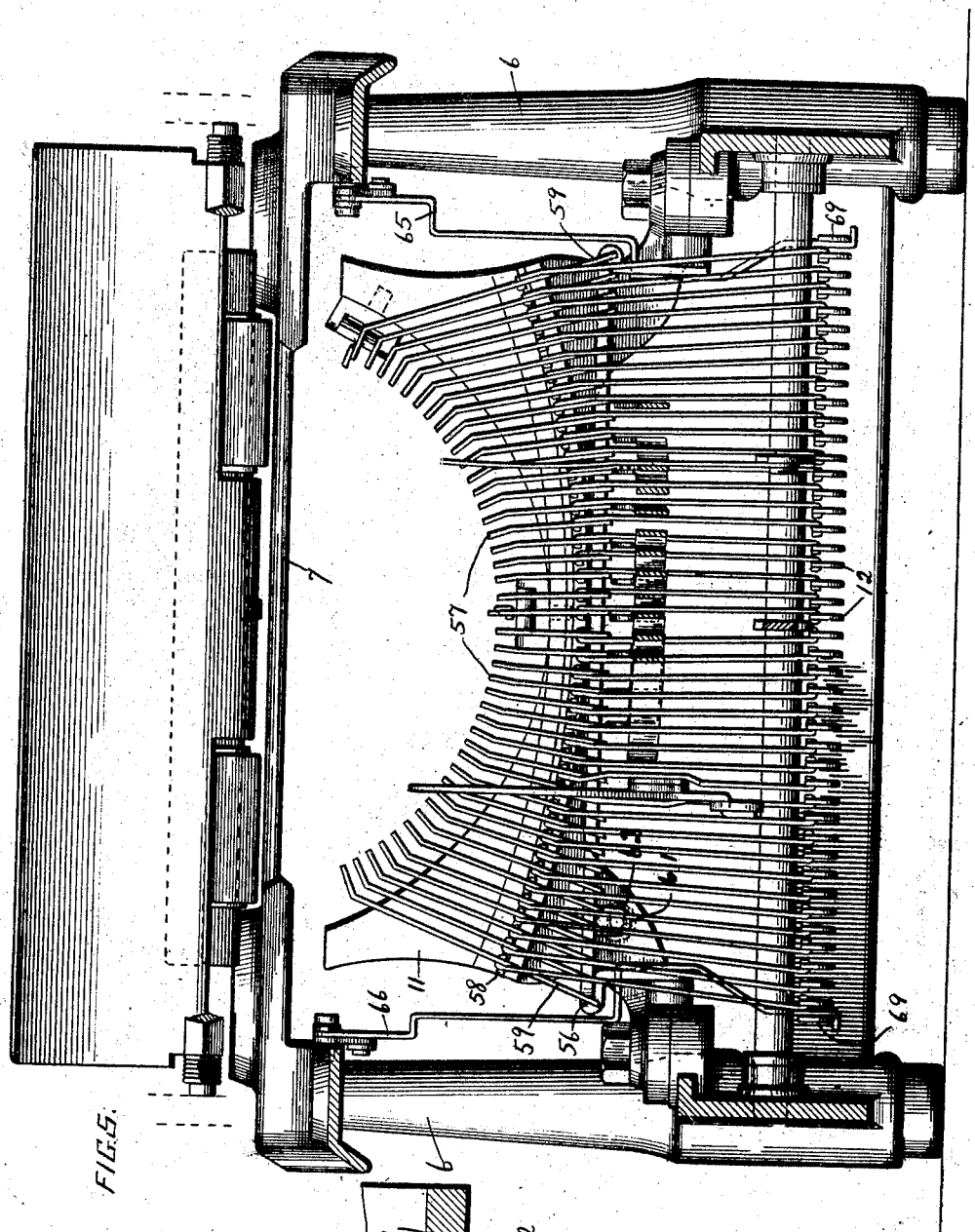
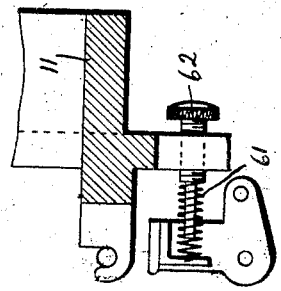
WITNESSES:
INVENTOR
Charles Spiro.
Attorney

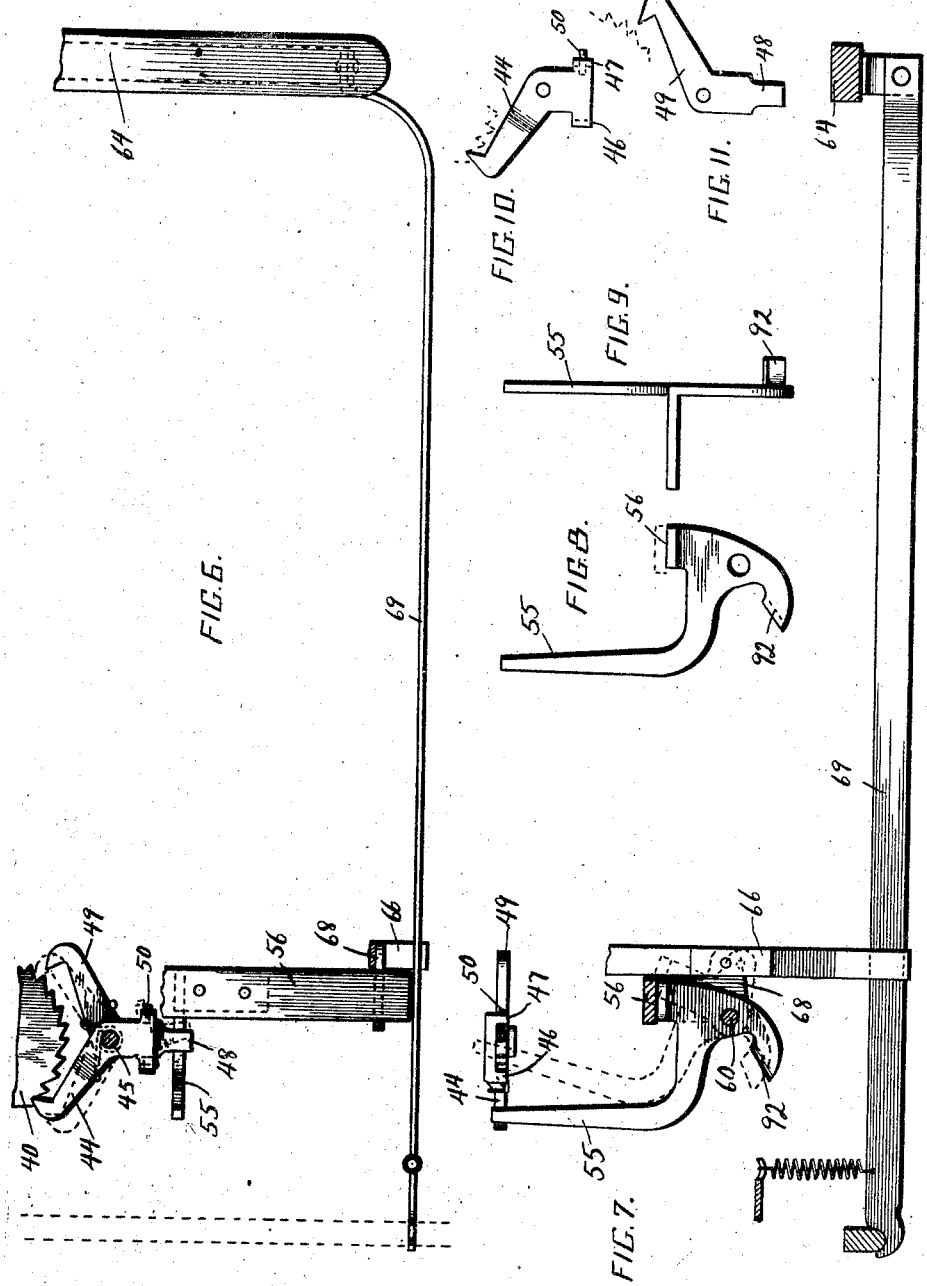

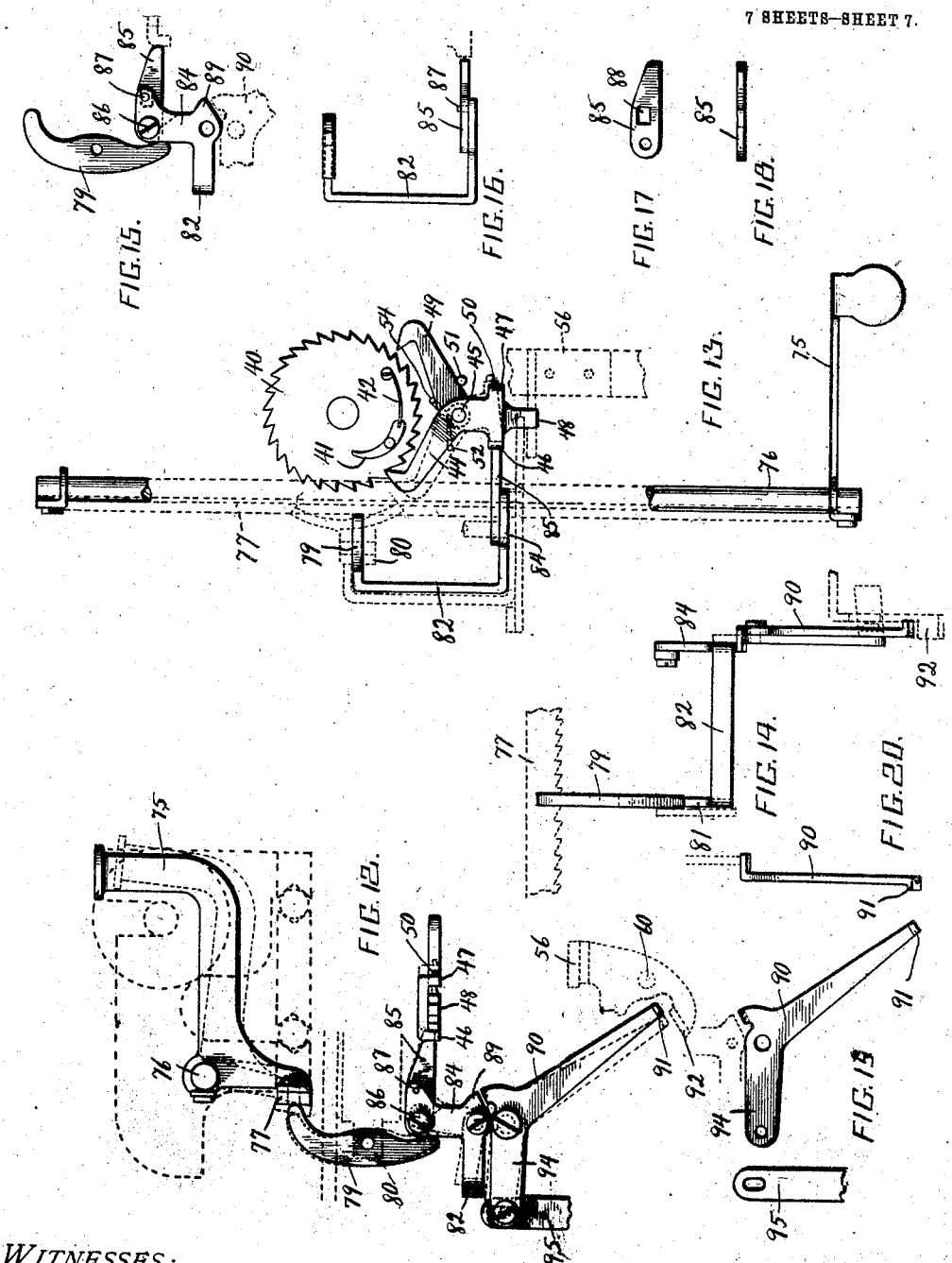
C. SPIRO.
CARRIAGE CONTROL MECHANISM.
APPLICATION FILED AUG. 15, 1910.
987,767.
Patented Mar. 28, 1911.
7 SHEETS—SHEET 7.
WITNESSES:
INVENTOR
Charles Spiro.
BY
Attorney

UNITED STATES PATENT OFFICE.

CHARLES SPIRO, OF NEW YORK, N. Y.

CARRIAGE-CONTROL MECHANISM.

987,767.  Specification of Letters Patent.  Patented Mar. 28, 1911.

Application filed August 15, 1910. Serial No. 577,183.

*To all whom it may concern:*

Be it known that I, CHARLES SPIRO, a citizen of the United States, residing at New York, county of New York, State of New York, have invented certain new and useful Improvements in Carriage-Control Mechanism, of which the following is a specification, reference being had therein to the accompanying drawing.

The invention disclosed in this application relates broadly to typewriting machines and specifically to the mechanisms of a typewriting machine which are particularly adapted for controlling the movement of the platen carriage.

The principal object of this invention is to provide an escapement mechanism of the pallet anchor type in which the angle between the escapement dog and holding dog may be varied in such manner as to change the character of the escapement action.

Another object of this invention is to provide an escapement mechanism of the pallet anchor type particularly adapted for a typewriting machine; the mechanism comprising an escapement dog and a holding dog so arranged that the holding dog may be entirely disengaged from the escapement wheel or circular rack when the escapement dog is disengaged from the circular rack, in such manner as to permit the carriage to run free from the escapement mechanisms.

Another object of this invention is to provide a total release key so constructed as to permit release of the carriage mechanism from control of the escapement devices and to lock the printing mechanism from actuation when the carriage is released from the escapement devices.

Another object of this invention is to construct a total release mechanism which coöperates with the escapement mechanism of the pallet anchor type in such manner as to swing the holding dog of the escapement out of the path of the teeth on the escapement wheel or circular rack, when the escapement dog is disengaged from the controlling wheel or rack.

Another object of this invention is to construct a typewriting machine with a removable carriage arranged in such manner that when the carriage is removed an automatic retaining dog is thrown into engagement with the rack teeth on the spring drum shaft when the carriage bed is removed from the typewriting machine.

A further object of this invention is to construct an escapement mechanism for a typewriting machine in which a substantially straight horizontal bar is mounted in the path of actuating sub-levers of different lengths in such manner that each sub-lever is adapted to actuate the universal bar through the same degree of movement.

A still further object of this invention is to construct an escapement mechanism for a typewriting machine in which both the typewriter carriage and the escapement rack are connected with the shaft of the spring drum which is housed in a permanent casing attached to the middle under portion of the typewriter top plate in such manner as to compactly arrange the escapement actuating devices within small compass.

Still other and further objects of this invention will in part be obvious and will in part be pointed out in the specification which hereinafter follows by reference to the accompanying drawings in which like numerals indicate like parts throughout the several figures thereof, and the scope of the invention will be indicated by the appended claims.

Figure 2:
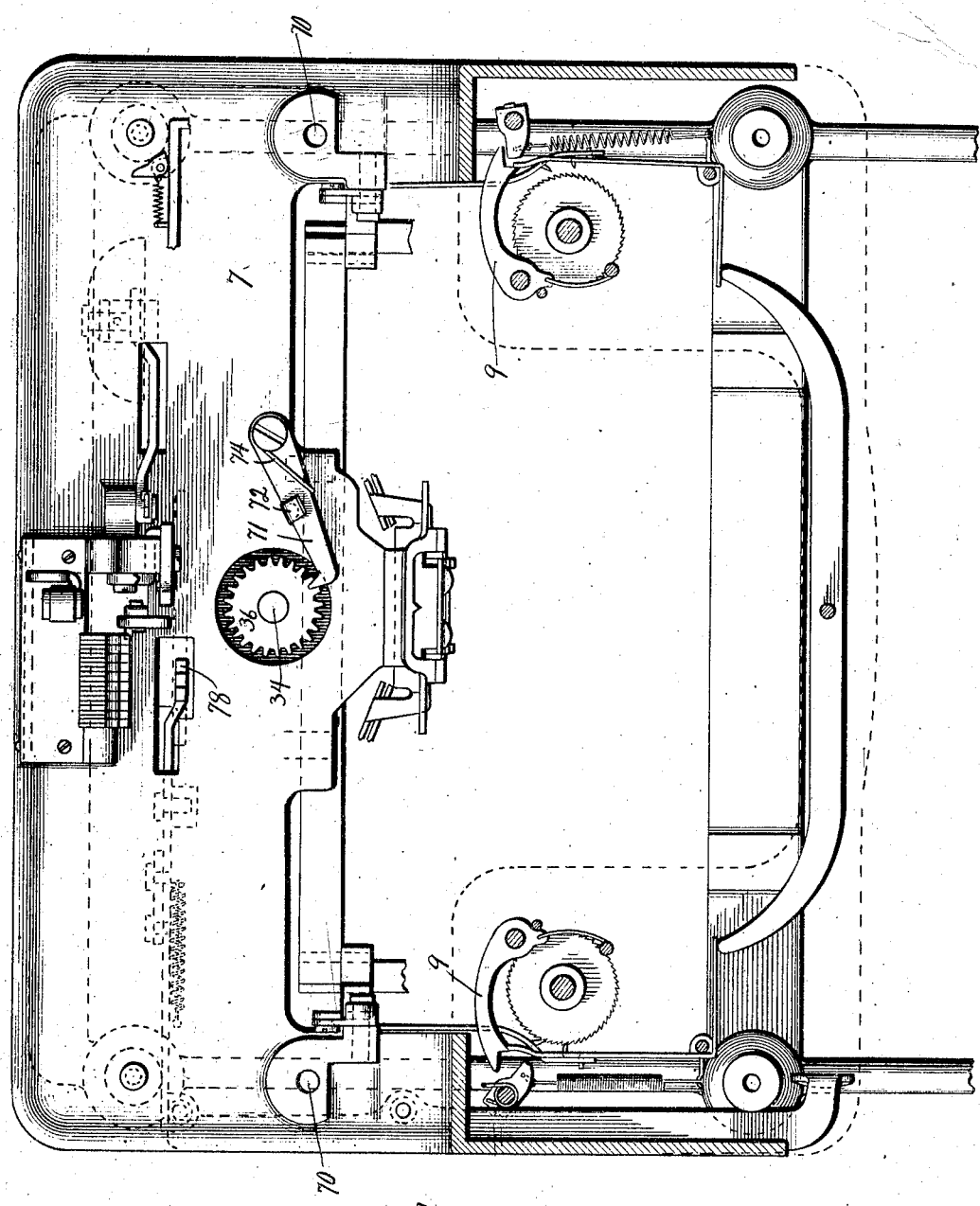
Figure 3:
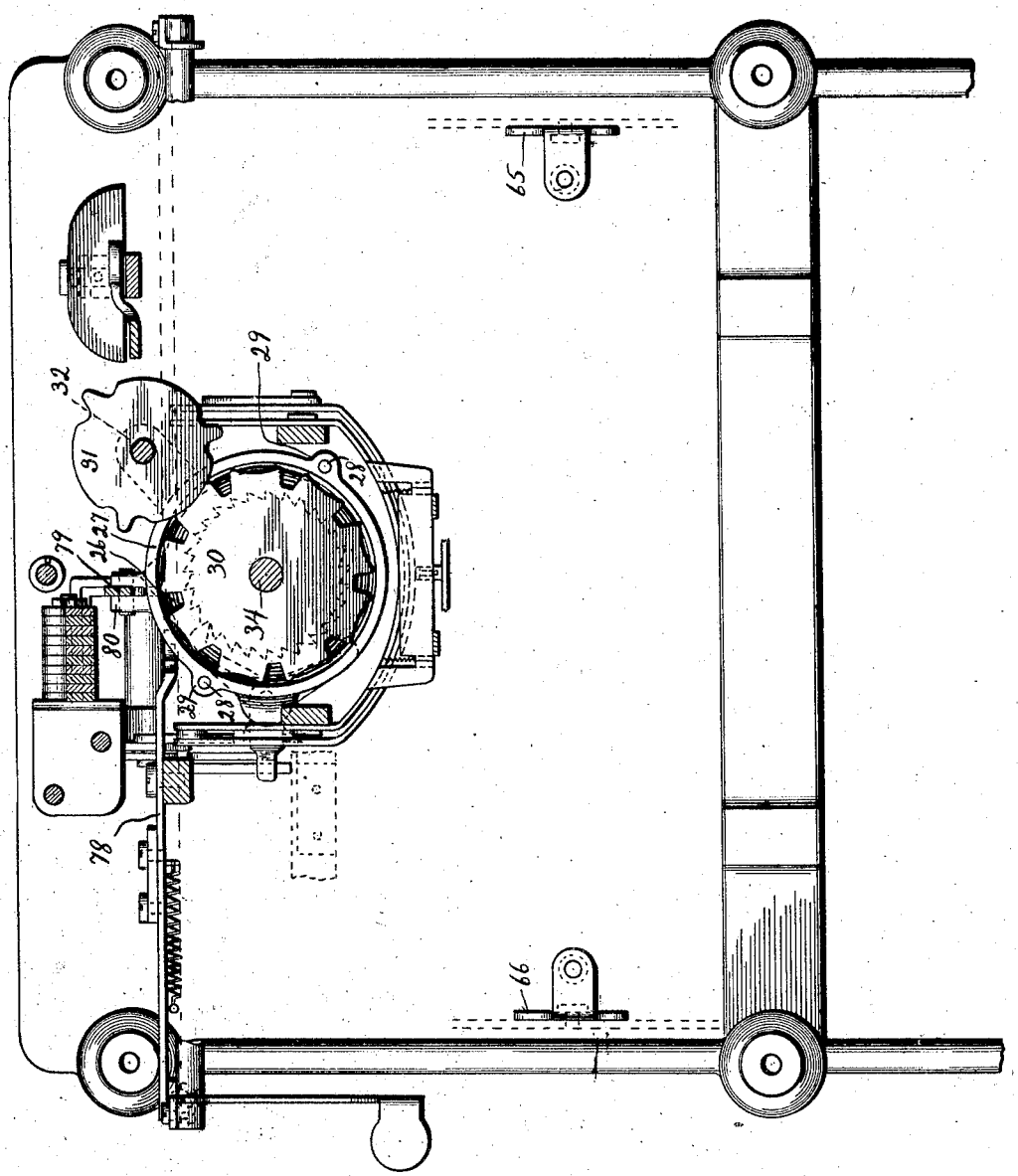

Figure 1 is a view showing a longitudinal sectional elevation of a typewriting machine. Fig. 2 is a plan view showing a portion of the top plate in section and the carriage removed. Fig. 3 is a plan view showing detail construction of the carriage spring control. Fig. 4 is a plan view showing the escapement mechanism in detail. Fig. 5 is a view showing the universal bar and sub-levers in transverse elevation. Fig. 6 is a plan view showing the connection between the spacing bar and the escapement mechanism. Fig. 7 is a view showing the connection between the spacing bar and the escapement mechanism in elevation. Fig. 8 is an elevational detail side view of the escapement dog actuator. Fig. 9 is an elevational detail end view of the escapement dog actuator. Fig. 10 is a detail plan view of the holding dog. Fig. 11 is a detail plan view of the escapement dog. Fig. 12 is a detail elevational view of the total release mechanism. Fig. 13 is a detail plan view of the total release mechanism. Fig. 14 is a detail end elevational view of the total release mechanism. Fig. 15 is a detail elevational view of the total release connecting yoke. Fig. 16 is a detail plan view of the total release connecting yoke. Fig. 17 is a detail elevation of the release actuating dog. Fig. 18 is a detail plan view of the release actuating dog. Fig. 19 is a detail view showing the locking stop disconnected from the actuating link. Fig. 20 is a side elevational view of the locking stop. Fig. 21 is a sectional view of the adjustable controlling springs for the universal bar.

Referring more particularly to Figs. 1, 2, 3, 4 and 5, of the drawings, several parts of the general typewriting machine construction are disclosed which do not form a specific part of this invention, but are covered by applications for patent co-pending with this application, and since these particular parts do not specifically coöperate with the carriage controlling mechanisms, they will be described in a general manner in the specification hereinafter following.

Referring more specifically to Figs. 1, 2, 3, 4 and 5, the typewriting machine disclosed in the drawings of this application, comprises a main frame which is composed of side members 1, that are joined together at the front by a front bar 2, and at the rear by a rear bar 4. Upright posts 5 and 6, are formed integral with the side members 1, and support upon their upper ends a top plate 7, which is connected to the supporting posts 5 and 6 by means of screws or any well known method of interlocking metallic parts. Ribbon spools 8 and actuating devices 9 therefor, are carried upon the forward portion of the top plate 7, upon opposite sides of the printing point in a manner well understood in the typewriter art. Type bars 10, are pivotally mounted within a type bar segment 11, and are operatively connected with key levers 12, which terminate at their forward ends in key caps 14. Type heads 15, which are carried upon the type bars 10, are adapted to be protected by lying within the curved portion of a front board 16, that is mounted in the main frame between front posts 5—5. A platen carriage 17, is adapted to support a cylindrical platen 18, which is mounted for reciprocation upon a carriage bed 19, by means of anti-friction balls 20. Platen shifting devices 21, are operatively connected with the supporting members for the cylindrical platen and with platen shift keys (not shown) located at the side of the key board in such manner as to control the shifting positions of the platen carriage. Tabulating mechanism 22, is arranged to control the platen carriage for tabulating work, and is operatively connected with tabulating keys 24. Line space mechanism 25, is carried upon the left side of the platen carriage in a manner well understood in typewriter art.

Referring more particularly to Figs. 1, 4, 6 and 7, the carriage controlling mechanism comprises a carriage driving spring 26, which is secured within a circular housing 27, that is bolted to the top plate 7, by means of stud screws which pass through openings 28, that are formed in lugs 29, on the sides of the housing 27. The carriage driving spring 26, is connected upon one end with a female member 30 of the Geneva escapement which enables the spring to be wound or unwound by means of coöperation with a male member 31 of the Geneva escapement, which is mounted upon a lug 32, in such manner as to be accessible from the rear of the machine frame in order that it may be grasped and turned by means of the thumb and finger. The inner end of the carriage driving spring 26, is connected with a driving shaft 34, which is journaled at its lower end in a bearing formed in the housing 27, and at its upper end in a bearing formed in a cover plate 35. The upper end of the driving shaft 34, carries fixedly mounted thereon a driving cog 36, which meshes with a longitudinal rack 37, that is fixedly mounted upon the under portion of the carriage frame 17. The lower end of the driving shaft 35, carries a brake disk 38, which is adapted for use in connection with the tabulating devices, and is more fully described in an application for patent specifically relating to tabulating mechanism which is co-pending with this application. A ratchet wheel 39, is riveted to the brake disk 38, in such manner as to be positively driven by the driving shaft 34. An escapement rack or wheel 40, is loosely mounted upon the driving shaft 34, and is adapted to be driven by means of a ratchet dog 41, which is held in engagement with the teeth on the ratchet wheel 39, by means of a light leaf spring 42, that is fixedly mounted upon the escapement wheel 40. The escapement mechanism *per se*, is of a type known as the pallet anchor type, and comprises a holding dog 44, which is pivoted to a bracket depending from the top plate, by means of stud screws 45, and is constructed with downwardly depending arms 46 and 47, which are adapted to overlie the tail portion 48 of an escapement dog 49. The downwardly depending portion 47, carries an adjustable stop screw 50, which determines the degree of angularity which is normally maintained between the holding dog 44 and the escapement dog 49. The escapement dog 49, is normally retained out of contact with the teeth of the escapement wheel 40 and against a stop pin 51, which is also carried by a bracket depending from the top plate, by means of a small coiled spring 52. A similar spring 54, normally maintains the adjustable stop screw 50 in contact with the tail portion 48 of the escapement dog 49. An escapement actuator 55, is fixedly mounted upon a universal bar 56, and is adapted to contact with the tail portion 48 of the escapement dog 49 when the universal bar is actuated under the influence of the key levers 12, which are operatively connected with sub-levers 57. The sub-levers 57, are radially mounted upon a curved pivot wire 58, and are provided with downward extensions 59, which increase in length in accordance with the distance the particular sub-lever is located from the middle of the segment 11.

Referring particularly to Fig. 5, it will be noted that the universal bar is substantially a straight horizontal bar pivoted in the machine frame as at 60. The arrangement and construction of the sub-levers and the universal bar is such that the actuation of the universal bar is uniform throughout the entire system of key levers and sub-levers.

Referring particularly to Figs. 5 and 21, a coiled spring 61, is mounted upon an adjustment screw 62, which is mounted in a portion of the segment member 11. The arrangement of parts is such that the tension upon the universal bar may be adjusted to change the touch of the finger keys or properly adjust the actuating parts. In order that the escapement mechanism may be actuated by a space bar 64, which is not connected to any of the sub-levers 57, vertical links 65 and 66 are connected to bracket members 67 and 68 carried by the universal bar 56, and are adapted to underlie space bar levers 69. The vertical links 65 and 66 are extended upward, and are also connected with ribbon actuating mechanisms, as is fully described in application for patent appertaining particularly to ribbon mechanism, which application is co-pending with this application.

By referring particularly to Figs. 1 and 2, the carriage bed 19, is normally mounted upon the top plate 7, by means of stud screws which extend upward through openings 70 in the top plate 7, and are screwed into the carriage bed 19. It will be noted that if the carriage bed and platen carriage mounted thereupon, be removed from the top plate 7, that some device should be thrown into actuation which would prevent the carriage driving spring from being thrown entirely free, because of the liability of the spring injuring the escapement members in its rapid movement to release its stored up power by unwinding.

Referring particularly to Fig. 2, a retaining dog 71, is pivotally mounted upon the top plate, and is adapted to engage the driving cog 36 in such manner as to prevent the rotation of the driving spring shaft 34. It will be noted that the retaining dog 71, is provided with a cam face 72 at about its middle portion, in such manner that when the carriage bed 19 is screwed into position on the top plate 7, the edge of the carriage bed 19 engages the cam face 72 and thus forces the retaining dog 71 gradually outward against the tension of a coiled spring 74, until the retaining dog has entirely passed outside of the path of the teeth of the driving cog 36. It will also be noted that immediately as the carriage bed is lifted from its position on the top plate, the retaining dog 71 will be forced into position between the teeth of the driving cog 36, by means of the tension of the coiled spring 74.

Referring more specifically to Figs. 1, 2, and 12 to 20 inclusive, the total release mechanism will be described, which comprises a release key 75, which is pivotally mounted upon a cross rod 76, that is mounted in the carriage from 17, and carries upon its lower end a cross bar 77, which is notched upon its lower edge to form a rack, which is adapted to be engaged by a back spacing dog 78 (shown in Figs. 2 and 3.) A rocking lever 79, is pivotally mounted in lugs 80, that are formed upon the exterior of the housing 27, and is adapted to bear at its lower end upon an upright extension 81, of a yoke 82, which is pivotally mounted upon the bracket depending from the top plate 7. A second upright 84, is formed on the other end of the yoke 82, and carries a release actuating dog 85, which is pivotally mounted upon the extension 84, by means of a stud screw 86, and is normally retained in horizontal position by means of a stop pin 87, which normally rests against the top wall of an opening 88, formed in the release actuating dog 85. The release actuating dog 85, is adapted to abut its nose against the downwardly depending arm 46 of the holding dog 44. The upright extension 84 of the yoke 82, is provided upon its lower portion with an actuating face 89, which is adapted to coöperate with a pivoted locking stop carrier 90, upon which is formed a locking stop 91, that is adapted to be swung into the path of an oscillating stop 92, that is carried by the universal bar 56. The pivoted locking stop carrier is provided with a rearward extension 94, which is adapted to be connected with a release key (not shown) by means of a vertical slotted link 95.

It will be noted that the arrangement and construction of parts disclosed in Figs. 12 to 20 inclusive, are such that when the release key 75 is depressed to throw the holding dog 44 out of engagement with the escapement wheel 40, that the locking stop 91 is thrown in the path of the oscillating stop 92, thus fixedly locking the movement of the universal bar, and consequently substantially locking the printing mechanisms and key levers.

Having thus described my invention what I desire to claim is:—

1. In an escapement mechanism for typewriting machines the combination of a typewriter carriage, a carriage propelling spring, a driving shaft connected with said carriage propelling spring, means connecting said driving shaft with said typewriter carriage, an escapement wheel mounted upon said driving shaft, a holding dog, an escapement dog, a universal bar, and a dog actuator mounted upon said universal bar and adapted to coöperate with a portion of said escapement dog.

2. In an escapement mechanism for typewriting machines the combination of a movable carriage, a carriage propelling spring, a driving shaft operatively connected with said carriage propelling spring and with said movable carriage, an escapement rack mounted upon said driving shaft, a holding dog, an escapement dog, said holding dog being provided with depending arms which are adapted to encompass a portion of said escapement dog, a universal bar, and a dog actuator carried by said universal bar in such manner as to be adapted to strike a portion of said escapement dog when the universal bar is actuated.

3. In an escapement mechanism for typewriting machines the combination of a movable carriage, a carriage propelling spring, a driving shaft operatively connected with said propelling spring and with said movable carriage, a holding dog, an escapement dog, said holding dog being provided with depending arms adapted to encompass a portion of said escapement dog, an adjustable stop member carried by one of said depending arms, a rocking universal bar, a dog actuator carried by said universal bar in such manner as to contact with a portion of said escapement dog when the universal bar is rocked.

4. An escapement mechanism for typewriting machines comprising a movable carriage, a carriage propelling spring, a driving shaft having its axis substantially in a vertical position, means connecting said driving shaft with said movable carriage, an escapement rack mounted upon said driving shaft, a holding dog, an escapement dog, pivot means upon which said holding dog and said escapement dog are independently mounted, and adjustable means carried by one of said dogs for changing the angular relationship between the engaging faces of said dogs.

5. An escapement mechanism for typewriting machines comprising a machine frame, a movable carriage reciprocally mounted upon said machine frame, a driving spring, a driving shaft operatively connected with said driving spring and having its axis substantially vertical and in a plane substantially bisecting said machine frame from front to rear, means connecting said driving shaft with said movable carriage, an escapement rack mounted upon said driving shaft, a holding dog, an escapement dog, said holding dog being mounted independently of said escapement dog in such manner that said holding dog may be removed from the path of said escapement rack independently of the movement of said escapement dog, and means for actuating said dogs, substantially as described.

6. An escapement mechanism for typewriting machines comprising a machine frame, a top plate in said machine frame, a movable carriage mounted for reciprocal movement upon said top plate, a driving spring, a driving shaft operatively connected with said driving spring and having its axis substantially vertical, a rack and pinion connection between said driving shaft and said movable carriage, an escapement rack mounted upon said driving shaft, a holding dog, an escapement dog, and means for actuating said dogs, said driving spring, said driving shaft, said escapement rack and said dogs all being carried by said top plate, substantially as described.

7. An escapement mechanism for a typewriter carriage including a movable carriage, a propelling spring operatively connected with said movable carriage, an escapement rack, controlling dogs adapted to engage said escapement rack to control the movement of said carriage, means for actuating said controlling dogs, said actuating means including sub-levers radially mounted upon a curved pivot rod, key levers, connections between said key levers and said sub-levers, and a horizontal pivotally mounted universal bar arranged in the path of a portion of said sub-levers between the pivots of the sub-levers and their connections to the key levers, substantially as described.

8. In a typewriting machine the combination of a movable carriage, a carriage driving spring, an escapement mechanism of the pallet anchor type for controlling the letter spacing movement of said movable carriage, said escapement mechanism including a holding dog, an escapement dog, a finger key mounted upon said carriage, a swinging bar operatively connected with said finger key, and means mounted upon the machine frame and operatively connected with said swinging bar and said escapement mechanism in such manner that said holding dog is removed from the path of said escapement mechanism when said finger key is depressed.

9. In a typewriting machine the combination of a machine frame, a carriage bed removably mounted on said machine frame, a platen carriage reciprocally mounted upon said carriage bed, a driving spring, a driving shaft operatively connected with said driving spring, a driving cog member carried upon said driving shaft, a rack carried by said platen carriage and adapted to coöperate with said driving cog member when said carriage bed is in position upon said machine frame, a detent holding member pivotally mounted upon said machine frame, and means for causing said detent holding member to engage said driving cog when said removable carriage bed is removed from said machine frame.

In testimony whereof I affix my signature in presence of two witnesses.

CHARLES SPIRO.

Witnesses:
   EDWD. E. JONES,
   FRANK THORLIN.